US010326585B2

(12) United States Patent
Kafai et al.

(10) Patent No.: US 10,326,585 B2
(45) Date of Patent: Jun. 18, 2019

(54) HASH VALUE GENERATION THROUGH PROJECTION VECTOR SPLIT

(71) Applicant: Hewlett Packard Enterprise Development LP, Houston, TX (US)

(72) Inventors: Mehran Kafai, Redwood City, CA (US); Kave Eshghi, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 240 days.

(21) Appl. No.: 15/185,727

(22) Filed: Jun. 17, 2016

(65) Prior Publication Data
US 2017/0364517 A1    Dec. 21, 2017

(51) Int. Cl.
*H04L 9/00* (2006.01)
*G06F 17/10* (2006.01)

(52) U.S. Cl.
CPC ............ *H04L 9/00* (2013.01); *G06F 17/10* (2013.01)

(58) Field of Classification Search
CPC ......... G06F 17/3033; G06F 17/10; H04L 9/00
See application file for complete search history.

(56) References Cited

U.S. PATENT DOCUMENTS

| 7,194,465 | B1 | 3/2007 | MacGregor |
| 8,429,216 | B2 | 4/2013 | Eshghi et al. |
| 8,977,627 | B1 | 3/2015 | Vijayanarasimhan et al. |
| 9,317,917 | B2 | 4/2016 | Stemmer |
| 2010/0077015 | A1 | 3/2010 | Eshghi |
| 2011/0299721 | A1 | 12/2011 | He et al. |
| 2012/0121194 | A1 | 5/2012 | Yagnik |
| 2012/0158741 | A1* | 6/2012 | Scholz ............... G06F 17/3053 707/748 |
| 2015/0127342 | A1* | 5/2015 | Sharifi ................. G10L 17/005 704/239 |
| 2015/0286827 | A1* | 10/2015 | Fawaz ...................... H04L 9/00 726/26 |

OTHER PUBLICATIONS

Bingham, E. et al.; "Random Projection in Dimensionality Reduction: Applications to Image and Text Data"; Oct. 30, 2003; 6 pages.
(Continued)

*Primary Examiner* — Cam Y T Truong
(74) *Attorney, Agent, or Firm* — Hewlett Packard Enterprise Patent Department (57) ABSTRACT

A system may include an access engine to access an input vector as well as a projection matrix. The projection matrix may include a number of rows equal to a number of hash values to generate from the input vector multiplied by the square root of an inverted sparsity parameter specifying a ratio of the hash universe size from which the hash values are generated to the number of hash values to generate. The projection matrix may include a number of columns equal to the dimensionality of the input vector. The system may also include a hash computation engine to determine a projection vector from the projection matrix and the input vector, split the projection vector into a number of sub-vectors equal to the number of hash values to generate, and generate a hash value from each of the sub-vectors.

20 Claims, 6 Drawing Sheets

(56) References Cited

OTHER PUBLICATIONS

Hsu, J. et al.; "Distributed Private Heavy Hitters"; Nov. 6, 2014; 20 pages.
Mu, Y. et al.; "Accelerated Large Scale Optimization by Concomitant Hashing"; Aug. 2, 2012; 14 pages.
Wang, J. et al.; "Learning to Hash for Indexing Big Data-Survey"; Jan. 2016; 24 pages.
Sahlgren, Magnus; An introduction to random indexing, In Methods and Applications of Semantic Indexing Workshop at the 7th International Conference on Terminology and Knowledge Engineering, TKE 2005 (Year 2005).

* cited by examiner

HASH VALUE GENERATION THROUGH PROJECTION VECTOR SPLIT

BACKGROUND

With rapid advances in technology, computing systems are increasingly prevalent in society today. Vast computing systems execute and support applications that communicate and process immense amounts of data, many times with performance constraints to meet the increasing demands of users. Increasing the efficiency, speed, and effectiveness of computing systems will further improve user experience.

BRIEF DESCRIPTION OF THE DRAWINGS

Certain examples are described in the following detailed description and in reference to the drawings.

DETAILED DESCRIPTION

The discussion below refers to input vectors. An input vector may refer to any vector or set of values in an input space that represents an object. Input vectors may represent data objects in a physical system, and used across any number of applications. For example, a set of input vectors may specify characteristics of video streaming data, digital images, internet or network traffic, organization or corporation records, gene sequences, human facial features, speech data, and countless other types of data. As such, input vectors may be used to support machine-learning, classification, statistical analysis, and applied in various other ways.

Various processing applications may use input vectors, and such applications may transform or manipulate the input vectors in different ways for analysis, machine-learning, classifier training, or other specific uses. As an example, a system or application may generate hash values from the input vectors to represent the input vectors in a feature space for comparison, performing similarity-based retrieval, classification, or for various other purposes.

Examples consistent with the present disclosure may support hash value generation through projection vector splits. As described in greater detail below, the hash value computation features described herein may support hash value generation in a hash universe (often of a very large size), but do so without determining projection vectors with a dimensionality (e.g., size) equal to the hash universe size. Generation of the hash values may be accomplished through splitting the projection vector and determining hash values from the resulting sub-vectors. In that regard, the hash value computation features described herein may improve computing functionality through increased computational efficiency, reducing the number of performed computations, reducing computation time and other resource constraints, or more. Such increases in computational efficiency may be particularly beneficial for large-sized input vector sets (e.g., in the tens of millions or more) and large feature spaces with dimensionality in the tens of thousands, hundreds of thousands, and more.

Figure 1:
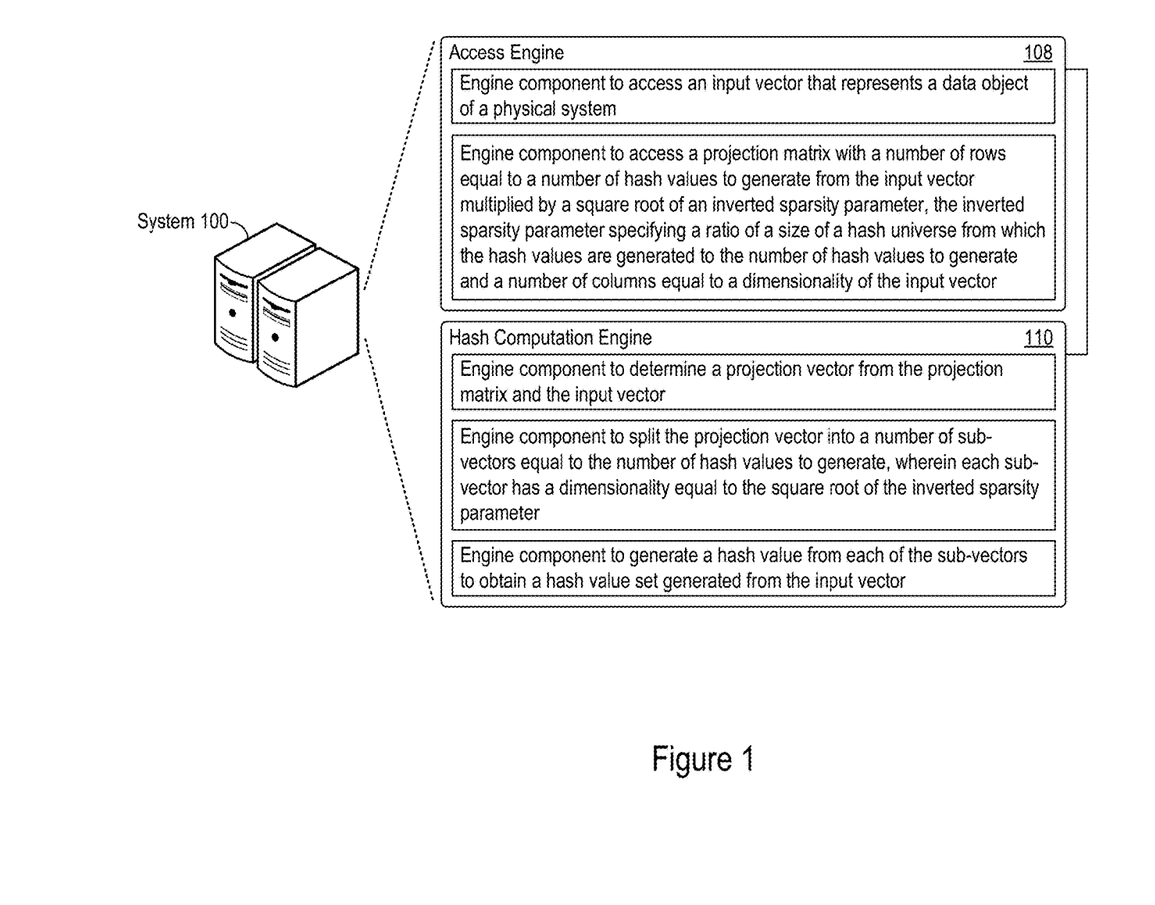
FIG. 1 shows an example of a system that supports hash value generation through projection vector splitting.

FIG. 1 shows an example of a system 100 that supports hash value generation through projection vector splitting. The system 100 may take the form of any computing system that includes a single or multiple computing devices such as servers, compute nodes, desktop or laptop computers, smart phones or other mobile devices, tablet devices, embedded controllers, and more.

As described in greater detail herein, the system 100 may compute hash values from input vectors, for example according to a Concomitant Rank Order (CRO) hashing process. In doing so, the system 100 may determine a projection vector from an input vector with a dimensionality less than the size of the hash universe from which the hash values are generated. The system 100 may split the projection vector into a predetermined number of sub-vectors, computing hash values from the sub-vectors within a hash universe larger that the dimensionality of the projection vector from which the sub-vectors are split from.

The system 100 may implement various engines to provide or support any of the hash value generation features described herein. In the example shown in FIG. 1, the system 100 implements an access engine 108 and a hash computation engine 110. Many of the hash value computation features disclosed herein are described with respect to the access engine 108 and the hash computation engine 110, though various other forms and implementations are possible.

The system 100 may implement the engines 108 and 110 (including components thereof) in various ways, for example as hardware and programming. The programming for the engines 108 and 110 may take the form of processor-executable instructions stored on a non-transitory machine-readable storage medium, and the processor-executable instructions may, upon execution, cause hardware to perform any of the features described herein. In that regard, various programming instructions of the engines 108 and 110 may implement engine components to support or provide the features described herein.

The hardware for the engines 108 and 110 may include a processing resource to execute programming instructions. A processing resource may include various number of processors with a single or multiple processing cores, and a processing resource may be implemented through a single-processor or multi-processor architecture. In some examples, the system 100 implements multiple engines using the same system features or hardware components (e.g., a common processing resource).

The access engine 108 and the hash computation engine 110 may include components to generate hash values from input vectors representing data objects of a physical system. As shown in the example implementation of FIG. 1, the access engine 108 may include engine components to access an input vector that represents a data object of a physical system and access a projection matrix with a number of rows equal to a number of hash values to generate from the input vector multiplied by a square root of an inverted sparsity parameter, the inverted sparsity parameter specifying a ratio of a size of a hash universe from which the hash values are generated to the number of hash values to generate as well as a number of columns equal to a dimensionality of the input vector.

As likewise shown in the example implementation in FIG. 1, the hash computation engine 110 may include engine components to determine a projection vector from the projection matrix and the input vector; split the projection vector into a number of sub-vectors equal to the number of hash values to generate, wherein each sub-vector has a dimensionality equal to the square root of the inverted sparsity parameter; and generate a hash value from each of the sub-vectors to obtain a hash value set generated from the input vector.

These and other aspects of the hash value generation features disclosed herein are described in greater detail next.

Figure 2:
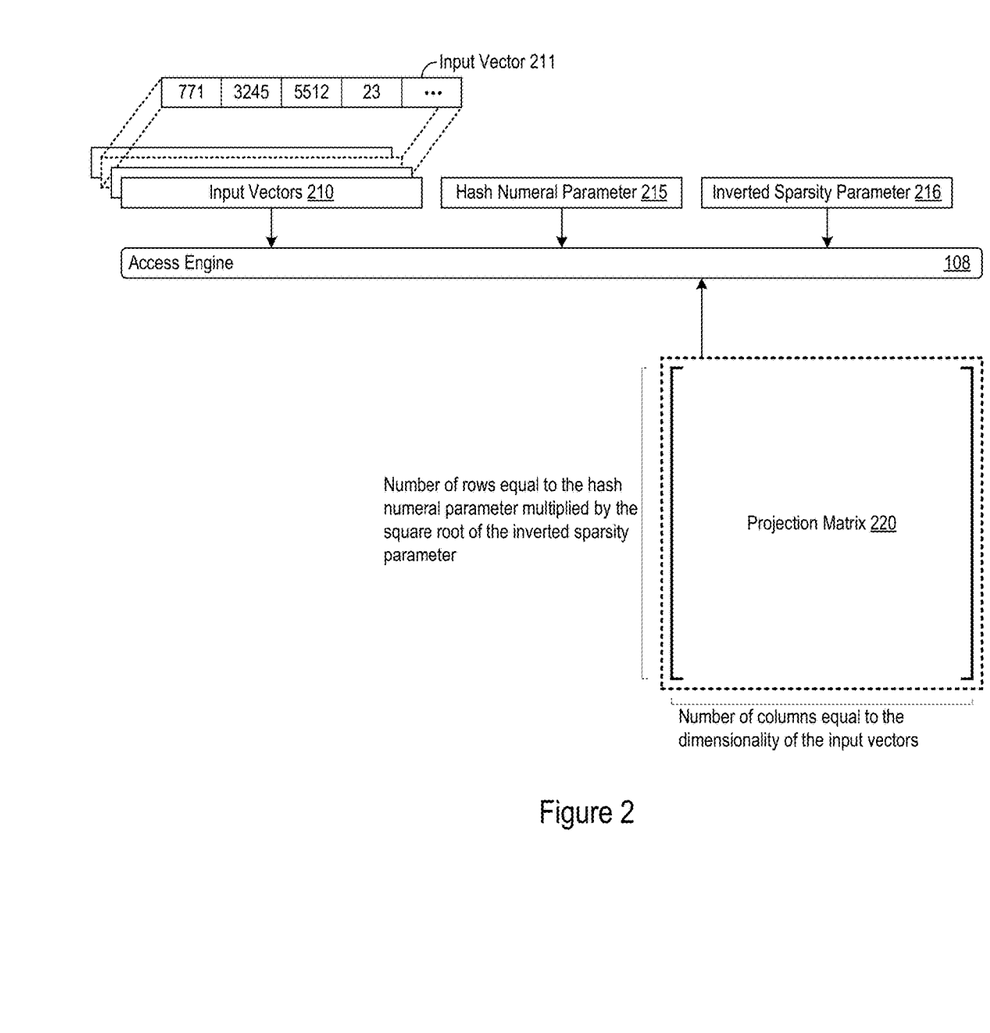
FIG. 2 shows an example of data elements an access engine may access to support hash value generation through projection vector splitting.

FIG. 2 shows an example of data elements that an access engine 108 may access to support hash value generation through projection vector splitting. In the example in FIG. 2, the access engine 108 access a set of input vectors 210 that includes a particular input vector labeled as the input vector 211. The access engine 108 may access the set of input vectors 210 for processing and use in varying functions, e.g., for machine learning tasks, classifier training, or other applications. The input vectors 210 may characterize or otherwise represent data objects of a physical system. Example physical systems include video streaming and analysis systems, banking systems, document repositories and analysis systems, geo-positional determination systems, enterprise communication networks, medical facilities storing medical records and biological statistics, and countless other systems that store, analyze, or process data. In some examples, the access engine 108 receives the input vectors 210 as a real-time data stream for processing, analysis, classification, model training, or various other applications.

To access the set of input vectors 210, the access engine 108 may retrieve the input vectors 210 from a memory, receive the input vectors 210 over a network connection, or in any other way to obtain the input vectors 210. In some examples, the number of input vectors included in the set of input vectors 210 may number in the millions, tens of millions, or more. Such input vector numbers may be possible for training sets for speech recognition, image classification, or various other classifier training applications. Processing the set of input vectors 210 may include generation of hash values for some or all of the input vectors 210. An example hashing process a system may employ is the Concomitant Rank Order (CRO) hashing process, for example as described in any of U.S. Pat. No. 8,429,216 issued on Apr. 23, 2013, U.S. patent application Ser. No. 15/142,357 filed on Apr. 29, 2016, and U.S. patent application Ser. No. 15/166,026 filed on May 26, 2016, each of which are incorporated by reference herein in their entirety. For each input vector of the set of input vectors 210, a system may generate a hash value set using any of the hash generation features described herein with respect to the access engine 108, the hash computation engine 110, or a combination of both.

The access engine 108 may access a hash numeral parameter 215 used in hash value computations. The hash numeral parameter 215 may specify a number of hash values to generate (e.g., compute) from an input vector. In some examples, the hash numeral parameter 215 specifies the number of hash values to generate per each input vector of the set of input vectors 210. For ease of reference, the hash numeral parameter 215 is also referred herein interchangeably as T.

As another example of a data element accessed for hash value computations, the access engine 108 may access an inverted sparsity parameter 216. The inverted sparsity parameter 216 may characterize a relationship between the hash universe from which hash values are generated (e.g., the size to the hash universe) and the number of hash values to generate (e.g., as specified by the hash numeral parameter 215). In particular, the inverted sparsity of a hash value set may specify a ratio of a size of a hash universe from which the hash values of a hash value set are generated to the number of hash values to generate for the hash value set. The inverted sparsity parameter 216 may set a value for this ratio. For ease of reference, the inverted sparsity parameter 216 is also referred herein interchangeably as S.

The terms sparsity and inverted sparsity as used herein may be understood with reference to a binary representation of a generated hash value set including T number of hash values. The binary representation of a hash value set may take the form of a binary vector with '1' values at each vector index equal to a hash value in the hash value set and with '0' values otherwise. The dimensionality (e.g., size) of the binary vector may thus be understood as the size of the hash universe from which the hash values are computed or otherwise selected. As such, the sparsity of the binary vector may specify the ratio of the number of vector elements with a '1' value in the binary vector to the dimensionality of the binary vector. The inverted sparsity of the binary vector may specify the inverse of the sparsity, that is the ratio of the dimensionality of the binary vector (which also specifies the hash universe size) to the number of vector elements with a '1' value (which also specifies the number of hash values in the hash value set).

Thus, the product T*S may specify the size of the hash universe from which the hash values are generated from. The greater the value of the inverted sparsity parameter 216, the greater the size of the hash universe from which hash values are generated, and the less likely a hash collision may occur. The smaller the value of the inverted sparsity parameter 216, the lesser the size of the hash universe, and the less the computation expense of the hash value generation. The values for the hash numeral parameter 215 and the inverted sparsity parameter 216 may be configurable to suit particular application requirements, user demands, performance thresholds, or to satisfy any other metric or request.

As an example, the access engine 108 may configure the number of hash values to generate from input vectors (e.g., the hash numeral parameter 215), the inverted sparsity parameter 216, or both, through user input provided through a user interface. The hash numeral parameter 215 or the inverted sparsity parameter 216 may thus be configurable through a user interface such as a command line interface, a parameter in a code section set through a coding interface, or a graphical user interface, as examples. In some examples, the access engine 108 accesses the inverted sparsity parameter 216 through computing the value of the inverted sparsity parameter 216, for example responsive to user input specifying the hash numeral parameter 215 (e.g., the denominator of the inverted sparsity parameter 216) and the hash universe size (e.g., the numerator of the inverted sparsity parameter 216).

The inverted sparsity parameter 216 may be a perfect square. That is, the square root of the inverted sparsity parameter 216 may be an integer, i.e., $\sqrt{S}$ is an integer. The access engine 108 may configure or enforce this perfect square attribute of the inverted sparsity parameter 216 by applying an inverted sparsity criterion. The inverted sparsity criterion may be satisfied when the inverted sparsity parameter 216 for perfect square values and not satisfied for non-perfect square values of the inverted sparsity parameter 216. The access engine 108 may verify that the inverted sparsity parameter 216 is a perfect square prior to hash value computations for the set of input vectors 210 and respond to such a verification by requesting user input to change the inverted sparsity parameter 216 or issuing error notification when the inverted sparsity criterion is not satisfied.

As yet another example of a data element accessed for hash value computations, the access engine 108 may access a projection matrix 220. The projection matrix 220 may represent or effectuate computations of a CRO hashing process or any other computational process. Generally, the projection matrix may project an input vector into a different (e.g., feature) space, thus resulting in a projection vector. For the CRO hashing process, the projection matrix 220 may represent or effectuate the random permuting of input, extended, or intermediate vectors used in the CRO hashing process. In such cases, the projection matrix 220 may be referred to as a random matrix (which may also extend an input vector, e.g., through vector concatenation and padding of '0' values). As another example in the CRO hashing process, the projection matrix 220 may represent or effectuate an orthogonal transformation on an input, extended vector, or intermediate vector (e.g., in addition to the random permuting). In such cases, the projection matrix 220 may be referred to as a permuted orthogonal transformation matrix and apply an orthogonal transformation to the input vector, examples of which include discrete cosine transformations (DCTs), Walsh-Hadamard transformations, and more.

The size of the projection matrix 220 may depend on the hash numeral parameter 215, the inverted sparsity parameter 216, and the dimensionality of the input vectors 210. In particular, the projection matrix 220 may include a number of columns equal to the dimensionality of the input vectors 210 (e.g., of the dimensionality of the input vector 211). This way, the projection matrix 220 may account for each element of an input vector as part of a CRO hashing process or other computational process. Also, the projection matrix 220 may include a number of rows equal to the hash numeral parameter 215 multiplied by the square root of the inverted sparsity parameter 216. Phrased another way, the projection matrix 220 may have $T*\sqrt{S}$ number of rows, which may be an integer as $\sqrt{S}$ is an integer. The impact the projection matrix 220 including $T*\sqrt{S}$ number of rows (e.g., in contrast to having $T*S$ number of rows) is discussed in greater detail below.

In some examples, the access engine 108 itself generates the projection matrix 220 based on the hash numeral parameter 215, the inverted sparsity parameter 216, and the dimensionality of the input vectors upon which a CRO hashing process is performed. For ease of reference, the dimensionality of input vectors is also referred herein interchangeably as N. Thus, the access engine 108 may create a projection matrix 220 as a $T*\sqrt{S}$ by N matrix, e.g., with $T*\sqrt{S}$ number of rows and N number of columns. The access engine 108 may populate the values of the projection matrix 220 to effectuate the vector extension, random permutation, and orthogonal transformation operations included in a particular implementation of the CRO hashing process used to generate hash values for the input vectors.

As described with respect to FIG. 2, the access engine 108 may access any of a set of input vectors 210, a hash numeral parameter 215, an inverted sparsity parameter 216, and a projection matrix 220 to support hash value computations for the set of input vectors 210. The access engine 108 may access any of these data elements through retrieval of data structures stored in a volatile or non-volatile memory, reception of data elements from other computing systems (e.g., via network connections), identification of values or parameters from application code, receipt of user input provided through a user interface, computation of parameters or vector values, or through any combination thereof.

With these accessed data elements, a hash computation engine 110 may compute hash value sets from a set of input vectors. Generally, a hash computation engine 110 may determine a projection vector from the projection matrix 220 and an input vector, split the projection vector into a number of sub-vectors, and generate hash values from the resulting sub-vectors. These features are described in greater detail next with respect to FIGS. 3 and 4.

Figure 3:
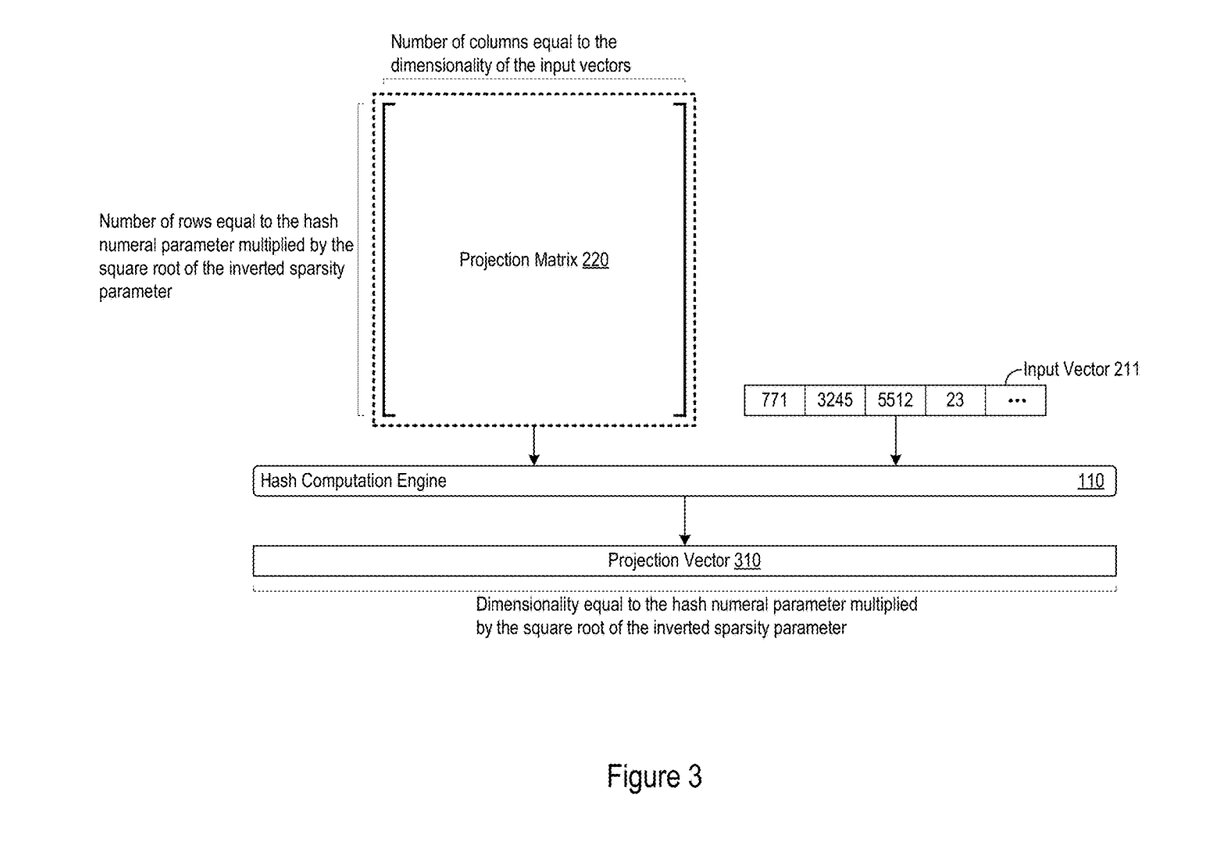
FIG. 3 shows an example of a projection vector that the hash computation engine may determine from a projection matrix and an input vector.

FIG. 3 shows an example of a projection vector 310 that the hash computation engine 110 may determine from a projection matrix and an input vector. In the particular example shown in FIG. 3, the hash computation engine 110 determines a projection vector 310 from the projection matrix 220 and the input vector 211. To do so, the hash computation engine 110 may determine the projection vector 310 through a matrix multiplication operation between the projection matrix 220 and the input vector 211. Expressed in another way, the hash computation engine 110 may determine the projection vector P as P=MI where M represents the projection matrix 220 and I represents an input vector (e.g., the input vector 211 or any other input vector of the set of input vectors 210).

In some examples, the particular calculations the hash computation engine 110 performs to determine the projection vector 310 may vary depending on the characteristics of the projection matrix 220. Some examples are described using the projection matrix 220 and the input vector 211. In instances where the projection matrix 220 is a random matrix representative of computations performed in a CRO hashing process, the hash computation engine 110 may determine the projection vector 310 through a matrix multiplication operation between the projection matrix 220 and the input vector 211. In instances where the projection matrix 220 is a permuted orthogonal transformation matrix representative of computations performed in a CRO hashing process, the hash computation engine 110 may determine the projection vector 310 through application of a random permutation and a subsequent orthogonal transformation (represented by the projection matrix 220) to the input vector 210.

The hash computation engine 110 may determine the projection vector 310 to have a dimensionality equal to the hash numeral parameter 215 multiplied by the square root of the inverted sparsity parameter 216, e.g., a dimensionality of $T*\sqrt{S}$. This may be the case as the projection matrix 220 includes a number of rows equal to $T*\sqrt{S}$, and projection vectors determined from the projection matrix 220 may thus have a dimensionality of $T*\sqrt{S}$ as well.

From the projection vector 310 determined for a particular input vector, the hash computation engine 110 may generate hash values for the particular input vector (e.g., the input vector 211). In doing so, the hash computation engine 110 may generate hash values in a hash universe of size $T*S$ even though the projection vector has a dimensionality of $T*\sqrt{S}$. That is, the hash computation engine 110 may generate hash values through determination of a projection vector with a dimensionality smaller than the $T*S$ size of the hash value universe from which the hash values are generated. In doing so, the hash value generation process implemented by the hash computation engine 110 may provide increased computational efficiency and reduced resource consumption as compared to projection vectors computed with a dimensionality of $T*S$ to generate hash values in a hash universe of size $T*S$.

To support determination of hash values from a projection vector 310 of dimensionality $T*\sqrt{S}$, the hash computation engine 110 may perform a vector split, as described next.

Figure 4:
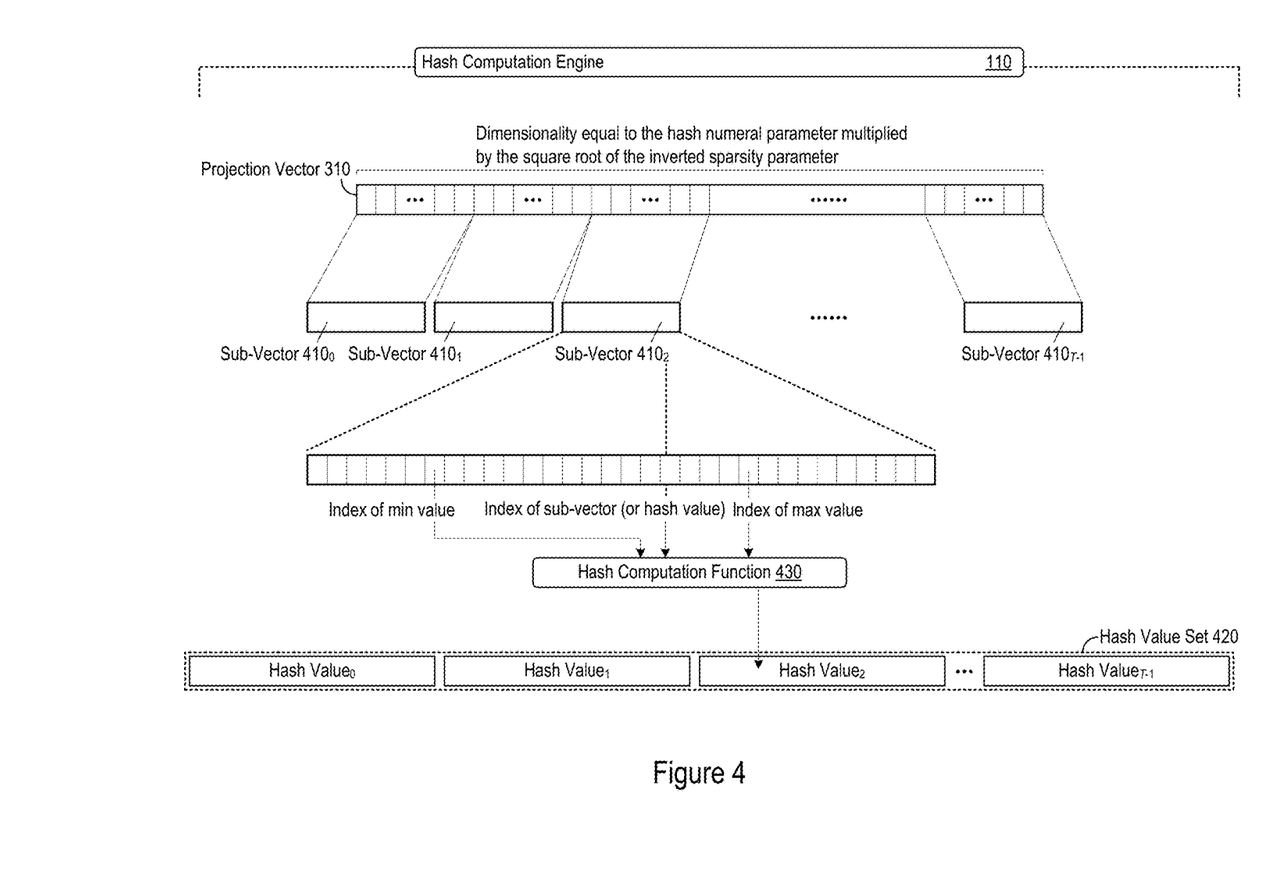
FIG. 4 shows an example of a hash value set generated by a hash computation engine through a projection vector split.

FIG. 4 shows an example of a hash value set generated by the hash computation engine 110 through a projection vector split. To generate a hash value set, the hash computation engine 110 may split a projection vector 310 into a number of sub-vectors equal to the hash numeral parameter 215 and generate a respective hash value from each sub-vector. As illustrated in FIG. 4, the hash computation engine 110 may split the projection vector 310 into T number of sub-vectors 410 including the sub-vectors shown as sub-vector $410_0$, sub-vector $410_1$, sub-vector $410_2$, and sub-vector$_{T-1}$.

The hash computation engine 110 may split a projection vector 310 such that the number of vector elements in each resulting sub-vector is the same. As the dimensionality of the projection vector 310 may be $T*\sqrt{S}$, the hash computation engine 110 may split projection vector 310 into T number of sub-vectors 410, each with $\sqrt{S}$ number of elements. In the example shown in FIG. 4, the hash computation engine 110 splits the projection vector 310 into the various sub-vectors 410 sequentially, e.g., the first $\sqrt{S}$ number of vector elements forming the sub-vector $410_0$, the next $\sqrt{S}$ number of vector elements forming the sub-vector $410_1$, and so on. In other implementations, the hash computation engine 110 may split the projection vector 310 by randomly assigning vector elements of the projection vector 310 to corresponding sub-vectors 410, using a round-robin distribution of vector elements, or according to any other configurable splitting process to split the projection vector 310 into T number of sub-vectors 410, each with a dimensionality of $\sqrt{S}$.

For each sub-vector 410, the hash computation engine 110 may generate a hash value. Thus, with T number of sub-vectors 410, the hash computation engine 110 may generate a hash value set with T number of hash values. One such hash value set is shown in FIG. 4 as the hash value set 420 with T number of hash values indexed from 0 to T-1.

To generate a hash value from a particular sub-vector, the hash computation engine 110 may implement or apply a hash computation function 430. The hash computation function 430 may receive various inputs determined from the particular sub-vector or other data inputs and compute, as an output, a corresponding hash value. In particular, the hash computation function 430 may receive the value of two sub-vector indices of a particular sub-vector as well as a hash index (or sub-vector index) as inputs and compute a hash value as an output. Moreover, the hash computation function 430 may generate hash values from the particular sub-vector within a hash universe of size T*S.

To compute a hash value for a particular sub-vector through the hash computation function 430, the hash computation engine 110 may identify sub-vector index values of the particular sub-vector to provide as inputs to the hash computation function 430. The hash computation engine 110 may identify two sub-vector indices from the particular sub-vector and may do so according to any number of sub-vector index selection criteria. In the example shown in FIG. 4, the hash computation engine 110 identifies a first sub-vector index of the minimum (e.g., smallest) value in a particular sub-vector as well as a second sub-vector index of the maximum value (e.g., largest) in the particular sub-vector. The hash computation engine 110 may provide these first and second sub-vector indices as inputs to the hash computation function 430. As other examples of sub-vector selection criteria, the hash computation engine 110 may randomly identify the first and second sub-vector indices, identify the first and second sub-vector indices according to a predetermined (e.g., random) distribution, or select sub-vector indices from a particular sub-vector in various other ways.

For the example sub-vector $410_2$ shown in FIG. 4, the hash computation engine 110 provides the sub-vector index of the $7^{th}$ element (min value of the sub-vector $410_2$) and the $23^{rd}$ element (max value of the sub-vector $410_2$) as inputs to the hash computation function 430. In identifying or providing sub-vector indices, the hash computation engine 110 may assign or identify sub-vector indices according to a zero-based index scheme with sub-vector elements indexed from 0 to $\sqrt{S}-1$. Thus, for the 32 sub-vector elements for the example sub-vector $410_2$ shown in FIG. 4, the hash computation engine 110 may identify sub-vector indices ranging from 0 to 31.

As also seen for the example sub-vector $410_2$ in FIG. 4, the hash computation engine 110 may provide the index of the particular sub-vector or the index of the particular hash value being generated as an input to the hash computation function 430. In FIG. 4, the hash computation engine 110 provides a value of 2 for the sub-vector $410_2$ from which Hash Value$_2$ of the hash value set 420 is generated. In a consistent manner as with sub-vector indices, the hash computation engine 110 may identify and differentiate between sub-vectors (and corresponding hash values) based on a zero-based index scheme. Thus, the hash computation engine 110 may index sub-vectors split from the projection vector 310 from 0 to T-1, and the corresponding hash values generated from each particular sub-vector are also indexed from 0 to T-1.

Turning to the hash computation function 430 itself, the hash computation engine 110 may implement the hash computation function 430 as any function that generates a hash value in the hash universe T*S from the received inputs. As such, the hash computation engine 110 may compute a unique hash value in the hash universe T*S for each combination of values of a first sub-vector index (e.g., min value), a second sub-vector index (e.g., max value), and an index of the particular sub-vector or hash value being computed (e.g., 2 for the sub-vector $410_2$ and the hash value$_2$). As one example, the hash computation function 430 may generate the hash value from a particular sub-vector as the sum of (i) the index of the particular sub-vector (or hash value) multiplied by the inverted sparsity parameter 216; (ii) the first sub-vector index multiplied by the square root of the inverted sparsity parameter 216; and (iii) the second sub-vector index.

Described another way, the hash computation engine 110 may implement the hash computation function 430 as $h_i = i*S + w*\sqrt{S} + v$, where $h_i$ represents the Hash Value$_i$ of a hash value set, i represents the index of the particular sub-vector or hash value being generated, w represents the sub-vector index of the smallest value (or according to any other sub-vector index selection criteria) in the particular sub-vector, v represents the sub-vector index of the largest value (or according to any other sub-vector index selection criteria) in the particular sub-vector, and S represents the inverted sparsity parameter 216. In this example, the hash computation function 430 may generate hash values in the hash universe of T*S when index inputs are provided according to a zero-based index scheme. To illustrate in this example, the smallest hash value that the hash computation function 430 may generate is 0, e.g., when i, w, and v each have a value of 0. The largest hash value that the hash computation function 430 may generate is T*S-1, e.g., when i has a value of T-1 and w and v each have a value of $\sqrt{S}$. Accordingly, the hash computation engine 430 in this example may generate hash values ranging from 0 to T*S−1, and thus from a hash universe of size T*S.

Although one example implementation of the hash computation function 430 is described above, the hash computation engine 110 may implement the hash computation function 430 in any way to generate hash values in the hash universe of T*S from inputs received with respect to the sub-vectors split from a projection vector 310 and any other input source. As another example using consistent terms as above, the hash computation function 430 may be implemented as $h_i=i*S+v*\sqrt{S}+w$, with the second sub-vector index (e.g., for the largest value in a particular sub-vector) being multiplied by the square root of the inverted sparsity parameter 216 instead of the first sub-vector index (e.g., for the smallest value in the particular sub-vector). Such an implementation would also generate hash values in the hash universe of size T*S.

The hash computation engine 110 may thus generate a respective hash value from sub-vectors split from a projection vector 310. The hash values generated from the sub-vectors form the hash value set 420. The hash computation engine 110 may thus compute T number of unique hash values from the T sub-vectors, the hash values generated from the hash universe of size T*S. Moreover, the hash computation engine 110 may do so from a projection vector of dimensionality $T*\sqrt{S}$. The hash computation engine 110 may thus support computation of hash values in the hash universe of size T*S, but do so without having to determine projection vectors of dimensionality T*S. Determination of projection vectors at a dimensionality of $T*\sqrt{S}$ instead may resulted in increased efficiency as a lesser number of computations are required to produce hash values from the same hash universe size.

As illustrative numbers, when T=1000 and $S=2^{10}$, the hash computation engine 110 may determine projection vectors with a dimensionality of 32,000 (i.e., $T*\sqrt{S}$) as opposed to projection vectors with a dimensionality of 1,024,000 (i.e. T*S). As the cost of computing projection vectors in a CRO or other hashing processes may comprise a significant portion of the computational expense, the hash computation engine 110 in this illustrative example may increase processing efficiency by up to a factor of $2^5$ (that is, by up to a 32× increase in efficiency). The hash value computation features described herein may thus improve computer performance and functionality, reducing processing time and increasing efficiency. For large input vector sets in the millions, tens of millions, or more, such increases in computing efficiency may be particularly beneficial and may support accurate, high-speed processing of immense real-time data streams.

Figure 5:
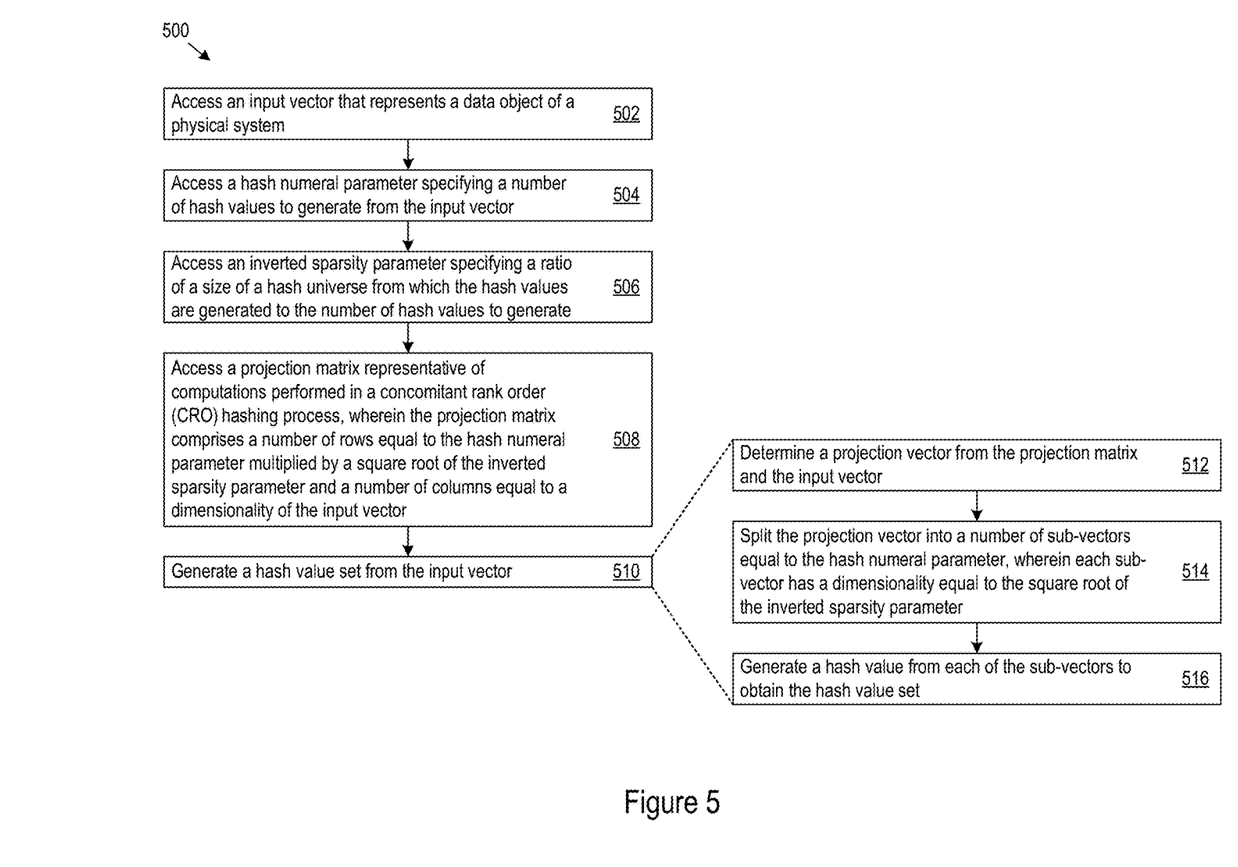
FIG. 5 shows a flow chart of an example method for hash value generation through projection vector splitting.

FIG. 5 shows a flow chart of an example method 500 for hash value generation through projection vector splitting. Execution of the method 500 is described with reference to the access engine 108 and the hash computation engine 110, though any other device, hardware-programming combination, or other suitable computing system may execute any of the steps of the method 500. As examples, the method 500 may be implemented in the form of executable instructions stored on a machine-readable storage medium or in the form of electronic circuitry.

In implementing or performing the method 500, the access engine 108 may access an input vector that represents a data object of a physical system (502). The access engine 108 may receive a set of input vectors as a training set for a machine-learning application, for instance. As illustrative numbers, the accessed input vectors may number in the millions, the tens of millions or more, for example as a real-time data stream for anomaly detection, speech recognition, image classification, or various other machine-learning applications and uses. The access engine 108 may also access a hash numeral parameter specifying a number of hash values to generate from the input vector (504).

The access engine 108 may also access an inverted sparsity parameter specifying a ratio of a size of the hash universe from which the hash values are generated to the number of hash values to generate (506). In some examples, the access engine 108 or other logic of a system may apply an inverted sparsity criterion to ensure the inverted sparsity parameter is a perfect square so that the square root of the inverted sparsity parameter is an integer. Application of the inverted sparsity criterion may, for example, occur when a user provides an input value specify or determine the inverted sparsity parameter, upon a code compilation or verification process (e.g., when the inverted sparsity parameter is specified through an application code value), or in other ways.

As another example, the access engine 108 may access a projection matrix representative of computations performed in a CRO hashing process, wherein the projection matrix may include a number of rows equal to the hash numeral parameter multiplied by the square root of the inverted sparsity parameter as well as a number of columns equal to the dimensionality (e.g., size) of the input vector (508). As noted above, the access engine 108 itself may generate the projection matrix, retrieve the projection matrix from system memory, receive the projection matrix from another computing system, and the like.

In implementing or performing the method 500, the hash computation engine 110 may generate a hash value set from the input vector (510). In particular, the hash computation engine 110 may generate a hash value set with a number of hash values equal to the hash numeral parameter. In doing so, the hash computation engine 110 may determine a projection vector from the projection matrix and the input vector (512), including in any of the ways described above. For instance, in examples where the projection is a random matrix, the hash computation engine 110 may determine the projection vector by calculating the projection vector through a matrix multiplication operation between the projection matrix and the input vector. In examples where the projection matrix is a permuted orthogonal transformation matrix, the hash computation engine 110 may determine the projection vector by calculating the projection vector through application of a random permutation and a subsequent orthogonal transformation represented by the projection matrix to the input vector. In such ways, the hash computation engine 110 may determine a projection vector that has a dimensionality equal to the hash numeral parameter multiplied by the square root of the inverted sparsity parameter.

In generating the hash value set from the input vector, the hash computation engine 110 may also split the projection vector into a number of sub-vectors (514). The number of sub-vectors the hash computation engine 110 splits the projection vector into may be equal to the hash numeral parameter and each sub-vector may have a dimensionality equal to the square root of the inverted sparsity parameter. Then, the hash computation engine 110 may generate a hash value from each of the sub-vectors to obtain the hash value set (516).

The hash computation engine 110 may generate the hash value for a particular sub-vector by identifying specific sub-vector indices in the particular sub-vector and generate the hash value using the identified sub-vector indices. For instance, the hash computation engine 110 may identify a first sub-vector index of the particular sub-vector for the smallest value in the particular sub-vector as well as a second sub-vector index of the particular sub-vector for the largest value in the particular sub-vector. When a particular sub-vector includes multiple elements with the largest or smallest value, the hash computation engine 110 may select from among these sub-vector indices randomly, accordingly to a predetermined selection scheme, the highest numbered sub-vector index among the multiple elements, the lowest numbered sub-vector index, or in any other way.

In some examples, the hash computation engine 110 may generate the hash value from the particular sub-vector using the first sub-vector index, the second sub-vector index, and an index of the hash value among the hash value set (which may also be the index of the particular sub-vector among the sub-vectors split from the projection vector).

Such hash value generation may be implemented or performed through a hash value computation function that computes a unique hash value in the hash universe for each combination of values of the first sub-vector index, the second sub-vector index, and the index of the hash value (or sub-vector). As an illustrative example, the hash computation engine 110 may implement a hash value computation function that computes the hash value for the particular sub-vector as a sum of the index of the hash value multiplied by the inverted sparsity parameter, the first index multiplied by the square root of the inverted sparsity parameter, and the second index.

In some examples, the access engine 108 accesses an input vector as part of an input vector set including multiple input vectors. To generate respective hash value sets for the multiple input vectors, the access engine 108 may access the same projection matrix to generate the hash value sets from the multiple input vectors. Likewise, the hash computation engine 110 may determine a respective projection vector for each of the multiple input vectors using the same projection matrix. That is, the same projection matrix may be accessed and used in hash value generation for each of the input vectors of an input vector set, which may number in the millions, tens of millions, or more in some instances.

Although one example was shown in FIG. 5, the steps of the method 500 may be ordered in various ways. Likewise, the method 500 may include any number of additional or alternative steps, including steps implementing any feature described herein with respect to the access engine 108, the hash computation engine 110, or a combination thereof.

Figure 6:
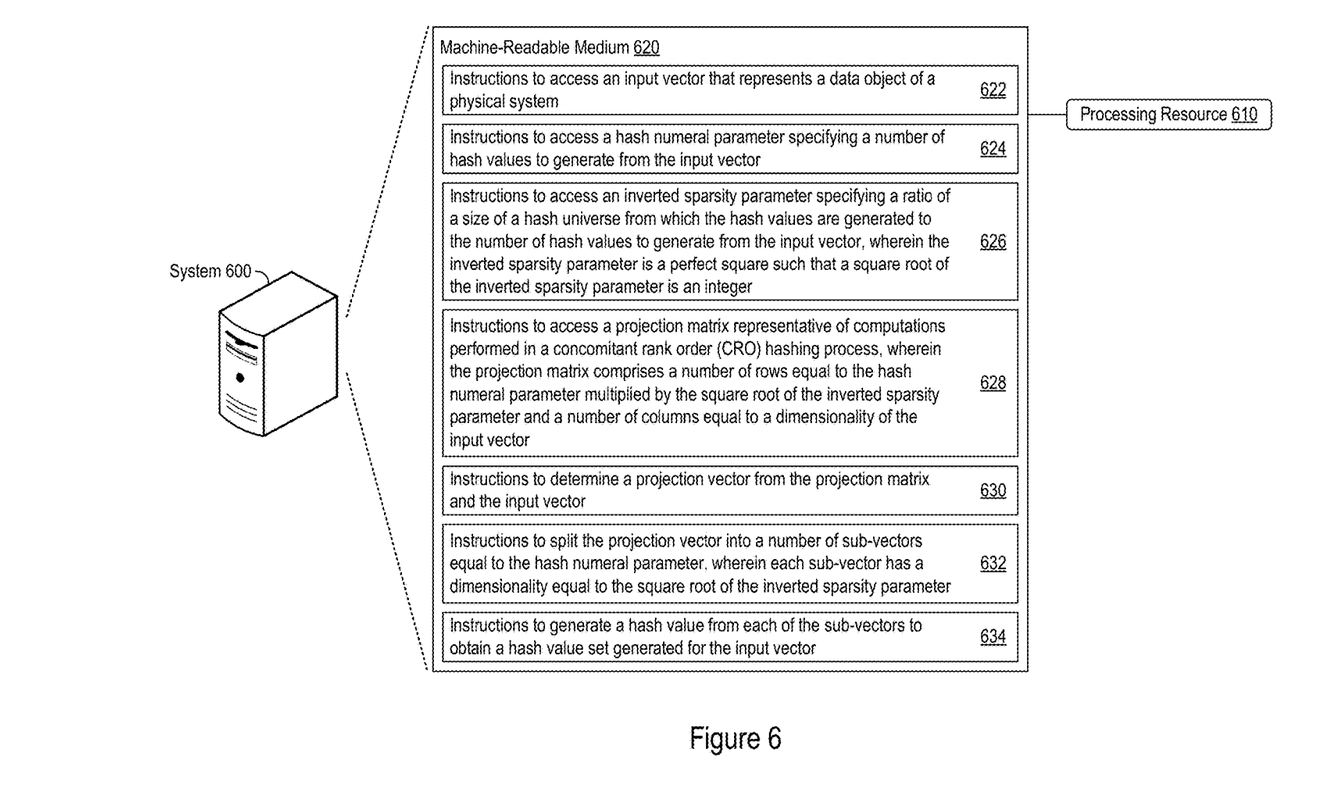
FIG. 6 shows an example of a system that supports hash value generation through projection vector splitting.

FIG. 6 shows an example of a system 600 that supports hash value generation through projection vector splitting. The system 600 may include a processing resource 610, which may take the form of a single or multiple processors. The processor(s) may include a central processing unit (CPU), microprocessor, or any hardware device suitable for executing instructions stored on a machine-readable medium, such as the machine-readable medium 620 shown in FIG. 6. The machine-readable medium 620 may be any non-transitory electronic, magnetic, optical, or other physical storage device that stores executable instructions, such as the instructions 622, 624, 626, 628, 630, 632 and 634 shown in FIG. 6. As such, the machine-readable medium 620 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 600 may execute instructions stored on the machine-readable medium 620 through the processing resource 610. Executing the instructions may cause the system 600 to perform any of the features described herein, including according to any features of the access engine 108, the hash computation engine 110, or a combination thereof.

For example, execution of the instructions 622, 624, 626, 628, 630, 632, and 634 by the processing resource 610 may cause the system 600 to access an input vector that represents a data object of a physical system (instructions 622); access a hash numeral parameter specifying a number of hash values to generate from the input vector (instructions 624); access an inverted sparsity parameter specifying a ratio of a size of a hash universe from which the hash values are generated to the number of hash values to generate from the input vector, wherein the inverted sparsity parameter is a perfect square such that a square root of the inverted sparsity parameter is an integer (instructions 626); access a projection matrix representative of computations performed in a CRO hashing process, wherein the projection matrix comprises a number of rows equal to the hash numeral parameter multiplied by the square root of the inverted sparsity parameter and a number of columns equal to a dimensionality of the input vector (instructions 628); determine a projection vector from the projection matrix and the input vector (instructions 630); split the projection vector into a number of sub-vectors equal to the hash numeral parameter, wherein each sub-vector has a dimensionality equal to the square root of the inverted sparsity parameter (instructions 632); and generate a hash value from each of the sub-vectors to obtain a hash value set generated for the input vector (instructions 634).

In some examples, the instructions 634 may be executable by the processing resource 610 to generate the hash value from a particular sub-vector by identifying a first sub-vector index of the particular sub-vector for the smallest value in the particular sub-vector; identifying a second sub-vector index of the particular sub-vector for the largest value in the particular sub-vector; and generating the hash value from the particular sub-vector using the first sub-vector index, the second sub-vector index, and an index of the hash value among the hash value set. To do so, the instructions 634, for example, may implement a hash computation function. In such examples, the instructions 634 may be executable by the processing resource 610 to generate the hash value from the particular sub-vector through application of the hash value computation function that computes a unique hash value in the hash universe for each combination of values of the first sub-vector index, the second sub-vector index, and the index of the hash value, including any of the examples described herein.

The systems, methods, devices, engines, and logic described above, including the access engine 108 and the hash computation engine 110, may be implemented in many different ways in many different combinations of hardware, logic, circuitry, and executable instructions stored on a machine-readable medium. For example, the access engine 108, the hash computation engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the access engine 108, hash computation engine 110, or both.

The processing capability of the systems, devices, and engines described herein, including the access engine 108 and the hash computation engine 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A computer system comprising:
one or more processors;
one or more memories;
an access engine is executed by the one or more processors to:
responsive to a user input provided on a user graphical interface:
access an input vector that represents a data object of a physical system and
access a projection matrix that is stored in the one or more memories, wherein the project matrix comprising: a number of rows equal to a number of hash values to generate from the input vector multiplied by a square root of an inverted sparsity parameter, the inverted sparsity parameter specifying a ratio of a size of a hash universe from which hash values are generated to the number of hash values to generate and a number of columns equal to a dimensionality of the input vector; and
a hash computation engine that is stored in the one or more memories is executed by the one or more processors to:
determine a projection vector from the projection matrix and the input vector upon a computer code compilation;
split the projection vector into a number of sub-vectors equal to the number of hash values to generate, wherein each sub-vector of the sub-vectors has a dimensionality equal to the square root of the inverted sparsity parameter; and
generate a hash value from said each sub-vector of the sub-vectors to obtain a hash value set generated from the input vector by applying a hash computer function, wherein the hash value set is based on the determination of the projection vector at a dimensionality of the number of hash values to generate multiplied by the square root of the inverted sparsity parameter instead of multiplying by the inverted sparsity parameter, thereby increasing processing efficiency of the hash computation engine executed on the computer system by up to a factor of the square root of the inverted sparsity parameter.

2. The system of claim 1, wherein the hash computation engine is to generate the hash value from a particular sub-vector by: identifying a first sub-vector index of the particular sub-vector for a smallest value in the particular sub-vector; identifying a second sub-vector index of the particular sub-vector for a largest value in the particular sub-vector; and generating the hash value from the particular sub-vector using the first sub-vector index, the second sub-vector index, and an index of the hash value among the hash value set.

3. The system of claim 2, wherein the hash computation engine is to generate the hash value from the particular sub-vector through a hash value computation function that computes a unique hash value in the hash universe for each combination of values of the first sub-vector index, the second sub-vector index, and the index of the hash value.

4. The system of claim 2, wherein the hash computation engine is to generate the hash value from the particular sub-vector as a sum of the index of the hash value multiplied by the inverted sparsity parameter; the first sub-vector index multiplied by the square root of the inverted sparsity parameter; and the second sub-vector index.

5. The system of claim 1, wherein the projection matrix is a random matrix representative of computations performed in a concomitant rank order (CRO) hashing process; and wherein the hash computation engine is to determine the projection vector through a matrix multiplication operation between the projection matrix and the input vector.

6. The system of claim 1, wherein the projection matrix is a permuted orthogonal transformation matrix representative of computations performed in a concomitant rank order (CRO) hashing process; and wherein the hash computation engine is to determine the projection vector through application of a random permutation and a subsequent orthogonal transformation represented by the projection matrix to the input vector.

7. The system of claim 1, wherein the access engine is to: access an input vector set comprising multiple input vectors, including the input vector; and access the same projection matrix to generate hash value sets from the multiple input vectors.

8. The system of claim 1, wherein the access engine is to configure the number of hash values to generate from the input vector, the inverted sparsity parameter, or both, through user input provided through a user interface.

9. The system of claim 1, wherein the access engine is to apply an inverted sparsity criterion to ensure the inverted sparsity parameter is a perfect square so that the square root of the inverted sparsity parameter is an integer.

10. A computer-implemented method comprising:
responsive to a user input provided on a user graphical interface:
accessing, by a computer, an input vector that represents a data object of a physical system,
accessing, by the computer, a hash numeral parameter specifying a number of hash values to generate from the input vector,
accessing, by the computer, an inverted sparsity parameter specifying a ratio of a size of a hash universe from which hash values are generated to the number of hash values to generate, and
accessing, by the computer, a projection matrix stored in the one or more memories, wherein representative of the projection matrix of computations performed in a concomitant rank order (CRO) hashing process, and wherein the projection matrix comprises a number of rows equal to the hash numeral parameter multiplied by a square root of the inverted sparsity parameter and a number of columns equal to a dimensionality of the input vector; and generating, by the computer, a hash value set from the input vector with a number of hash values equal to the hash numeral parameter, wherein the generating comprises:

determining, by using a hash computation engine of the computer, a projection vector from the projection matrix and the input vector upon a computer code compilation;

splitting, by using the hash computation engine of the computer, the projection vector into a number of sub-vectors equal to the hash numeral parameter, wherein each sub-vector of the sub-vectors has a dimensionality equal to the square root of the inverted sparsity parameter; and generating, by using the hash computation engine of the computer, a hash value from said each sub-vector of the sub-vectors to obtain the hash value set by applying a hash computer function, wherein the hash value set is based on the determination of the projection vector at a dimensionality of the number of hash values to generate multiplied by the square root of the inverted sparsity parameter instead of the number of hash values to generate multiplied multiplying by the inverted sparsity parameter, thereby increasing processing efficiency of the hash computation engine executed on the computer system by up to a factor of the square root of the inverted sparsity parameter.

11. The method of claim 10, wherein generating the hash value for a particular sub-vector comprises: identifying a first sub-vector index of the particular sub-vector for a smallest value in the particular sub-vector; identifying a second sub-vector index of the particular sub-vector for a largest value in the particular sub-vector; and generating the hash value from the particular sub-vector using the first sub-vector index, the second sub-vector index, and an index of the hash value among the hash value set.

12. The method of claim 11, wherein generating the hash value from the particular sub-vector comprises applying a hash value computation function that computes a unique hash value in the hash universe for each combination of values of the first sub-vector index, the second sub-vector index, and the index of the hash value.

13. The method of claim 12, wherein the hash value computation function computes the hash value for the particular sub-vector as a sum of: the index of the hash value multiplied by the inverted sparsity parameter, the first sub-vector index multiplied by the square root of the inverted sparsity parameter, and the second sub-vector index.

14. The method of claim 10, wherein the projection matrix is a random matrix; and wherein determining the projection vector comprises calculating the projection vector through a matrix multiplication operation between the projection matrix and the input vector.

15. The method of claim 10, wherein the projection matrix is a permuted orthogonal transformation matrix; and wherein determining the projection vector comprises calculating the projection vector through application of a random permutation and a subsequent orthogonal transformation represented by the projection matrix to the input vector.

16. The method of claim 10, wherein accessing the input vector comprises accessing multiple input vectors; and wherein accessing the projection matrix comprises accessing the same projection matrix to generate hash value sets from the multiple input vectors.

17. The method of claim 10, further comprising applying an inverted sparsity criterion to ensure the inverted sparsity parameter is a perfect square so that the square root of the inverted sparsity parameter is an integer.

18. A non-transitory machine-readable medium comprising instructions executable by a computer to:

responsive to a user input provided on a user graphical interface:

access an input vector that represents a data object of a physical system, access a hash numeral parameter specifying a number of hash values to generate from the input vector, access an inverted sparsity parameter specifying a ratio of a size of a hash universe from which hash values are generated to the number of hash values to generate from the input vector, wherein the inverted sparsity parameter is a perfect square such that a square root of the inverted sparsity parameter is an integer, and access a projection matrix stored in one or more memories, wherein a representative of projection matrix of computations performed in a concomitant rank order (CRO) hashing process, and wherein the projection matrix comprises a number of rows equal to the hash numeral parameter multiplied by the square root of the inverted sparsity parameter and a number of columns equal to a dimensionality of the input vector;

determine, by using a hash computation engine, a projection vector from the projection matrix and the input vector upon a computer code compilation;

split the projection vector into a number of sub-vectors equal to the hash numeral parameter, wherein each sub-vector has a dimensionality equal to the square root of the inverted sparsity parameter; and generate a hash value from each sub-vector of the sub-vectors to obtain a hash value set generated for the input vector by applying a hash computer function, wherein the hash value set is based on the determination of the projection vector at a dimensionality of the number of hash values to generate multiplied by the square root of the inverted sparsity parameter instead of the number of hash values to generate multiplied multiplying by the inverted sparsity parameter, thereby increasing processing efficiency of the hash computation engine executed on the computer by up to a factor of the square root of the inverted sparsity parameter.

19. The non-transitory machine-readable medium of claim 18, wherein the instructions are executable by the processing resource to generate the hash value from a particular sub-vector by: identifying a first sub-vector index of the particular sub-vector for a smallest value in the particular sub-vector; identifying a second sub-vector index of the particular sub-vector for a largest value in the particular sub-vector; and generating the hash value from the particular sub-vector using the first sub-vector index, the second sub-vector index, and an index of the hash value among the hash value set.

20. The non-transitory machine-readable medium of claim 19, wherein the instructions are executable by the processing resource to generate the hash value from the particular sub-vector through application of a hash value computation function that computes a unique hash value in the hash universe for each combination of values of the first sub-vector index, the second sub-vector index, and the index of the hash value.

* * * * *